(12) United States Patent
Ravishankar et al.

(10) Patent No.: US 8,199,892 B2
(45) Date of Patent: Jun. 12, 2012

(54) METHODS, SYSTEMS, AND COMPUTER PROGRAM PRODUCTS FOR PROVIDING A CALL ATTEMPT TRIGGERED MESSAGING SERVICE IN A COMMUNICATIONS NETWORK

(75) Inventors: Venkataramaiah Ravishankar, Cary, NC (US); Cory A. Grant, Apex, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1123 days.

(21) Appl. No.: 11/977,723

(22) Filed: Oct. 25, 2007
(Under 37 CFR 1.47)

(65) Prior Publication Data
US 2008/0285735 A1 Nov. 20, 2008

Related U.S. Application Data

(60) Provisional application No. 60/854,652, filed on Oct. 26, 2006.

(51) Int. Cl.
*H04M 3/42* (2006.01)
*H04M 1/56* (2006.01)
*H04M 15/06* (2006.01)

(52) U.S. Cl. .......... 379/207.02; 379/142.01; 379/142.06

(58) Field of Classification Search ............. 379/207.02, 379/142.01, 142.06, 201.07, 201.08; 370/331
See application file for complete search history.

(56) References Cited

U.S. PATENT DOCUMENTS

| | | | |
|---|---|---|---|
| 5,684,951 A | 11/1997 | Goldman et al. | |
| 5,768,509 A | 6/1998 | Gunluk | |
| 6,047,327 A | 4/2000 | Tso et al. | |
| 6,564,055 B1 | 5/2003 | Hronek | |
| 7,072,667 B2 | 7/2006 | Olrik et al. | |
| 7,072,976 B2 | 7/2006 | Lee | |
| 7,095,829 B2 | 8/2006 | Claudatos et al. | |
| 7,116,972 B1 | 10/2006 | Zhang et al. | |
| 7,120,455 B1 | 10/2006 | Chen et al. | |
| 7,136,634 B1 | 11/2006 | Rissanen et al. | |
| 7,155,243 B2 | 12/2006 | Baldwin et al. | |
| 7,248,857 B1 | 7/2007 | Richardson et al. | |
| 7,299,050 B2 | 11/2007 | Delaney et al. | |

(Continued)

FOREIGN PATENT DOCUMENTS

CN 1625146 A 6/2005

(Continued)

OTHER PUBLICATIONS

Notification of Transmittal of the International Search Report and the Written Opinion of the International Searching Authority, or the Declaration for International Application No. PCT/US07/22664 (Mar. 14, 2008).

(Continued)

*Primary Examiner* — Thjuan K Addy
(74) *Attorney, Agent, or Firm* — Jenkins Wilson Taylor & Hunt, P.A.

(57) ABSTRACT

Methods, systems, and computer program products for providing a call attempt triggered messaging service in a communications network comprises intercepting a call signaling message including a calling party subscriber identifier and a called party subscriber identifier. A call attempt triggered message generation (CATMG) database using the called party subscriber identifier is queried. In the event the called party subscriber identifier exists in the CATMG database, a messaging service message is generated. The messaging service message is then transmitted to a contact address.

21 Claims, 6 Drawing Sheets

U.S. PATENT DOCUMENTS

| | | | |
|---|---|---|---|
| 7,321,779 B2 | 1/2008 | Kang | |
| 7,394,818 B1 | 7/2008 | Johnson et al. | |
| 7,403,788 B2 | 7/2008 | Trioano et al. | |
| 7,454,164 B2 | 11/2008 | Goss | |
| 7,463,898 B2 | 12/2008 | Bayne | |
| 7,502,335 B2 | 3/2009 | Lin | |
| 7,548,756 B2 | 6/2009 | Velthuis et al. | |
| 7,817,987 B2 | 10/2010 | Mian et al. | |
| 7,912,908 B2 | 3/2011 | Cai et al. | |
| 7,917,128 B2 | 3/2011 | Niekerk et al. | |
| 2002/0010745 A1 | 1/2002 | Schneider | |
| 2002/0013711 A1 | 1/2002 | Ahuja et al. | |
| 2002/0023164 A1 | 2/2002 | Lahr | |
| 2002/0095333 A1 | 7/2002 | Jokinen et al. | |
| 2002/0120717 A1 | 8/2002 | Giotta | |
| 2002/0126708 A1 | 9/2002 | Skog et al. | |
| 2002/0147928 A1 | 10/2002 | Mahajan et al. | |
| 2003/0003935 A1 | 1/2003 | Vesikivi et al. | |
| 2003/0027591 A1 | 2/2003 | Wall | |
| 2003/0032409 A1 | 2/2003 | Hutcheson et al. | |
| 2003/0069991 A1 | 4/2003 | Brescia | |
| 2003/0076941 A1 | 4/2003 | Tiliks et al. | |
| 2003/0093314 A1 | 5/2003 | Leung et al. | |
| 2003/0096625 A1 | 5/2003 | Lee et al. | |
| 2003/0131263 A1 | 7/2003 | Keane et al. | |
| 2004/0054576 A1 | 3/2004 | Kanerva et al. | |
| 2004/0137922 A1 | 7/2004 | Kang | |
| 2004/0203581 A1 | 10/2004 | Sharon et al. | |
| 2004/0221011 A1 | 11/2004 | Smith et al. | |
| 2004/0243719 A1 | 12/2004 | Roselinsky | |
| 2005/0003838 A1 | 1/2005 | McCann et al. | |
| 2005/0021666 A1 | 1/2005 | Dinnage et al. | |
| 2005/0027867 A1 | 2/2005 | Mueller et al. | |
| 2005/0068971 A1 | 3/2005 | Meisl et al. | |
| 2005/0130685 A1 | 6/2005 | Jenkin | |
| 2006/0047572 A1 | 3/2006 | Moore et al. | |
| 2006/0120358 A1 | 6/2006 | Narasimhan et al. | |
| 2006/0168003 A1 | 7/2006 | Vau et al. | |
| 2006/0199597 A1 | 9/2006 | Wright | |
| 2006/0218613 A1 | 9/2006 | Bushnell | |
| 2006/0253453 A1 | 11/2006 | Chmaytelli et al. | |
| 2007/0026878 A1 | 2/2007 | Midkiff et al. | |
| 2007/0072591 A1 | 3/2007 | McGary et al. | |
| 2007/0088851 A1 | 4/2007 | Levkovitz et al. | |
| 2007/0206747 A1* | 9/2007 | Gruchala et al. | 379/142.01 |
| 2007/0271139 A1 | 11/2007 | Fiorini | |
| 2007/0275738 A1 | 11/2007 | Hewes et al. | |
| 2007/0282954 A1 | 12/2007 | Kim et al. | |
| 2007/0287463 A1 | 12/2007 | Wilson | |
| 2008/0004046 A1 | 1/2008 | Mumick et al. | |
| 2008/0031196 A1* | 2/2008 | Marathe et al. | 370/331 |
| 2008/0051066 A1 | 2/2008 | Bandhole et al. | |
| 2008/0101370 A1 | 5/2008 | Marsico et al. | |
| 2008/0139170 A1 | 6/2008 | Kahn | |
| 2008/0161028 A1 | 7/2008 | Fondë et al. | |
| 2008/0287150 A1 | 11/2008 | Jiang et al. | |
| 2009/0017794 A1 | 1/2009 | Wilson | |
| 2009/0047980 A1 | 2/2009 | Wilson | |
| 2009/0111489 A1 | 4/2009 | Wilson | |
| 2010/0210292 A1 | 8/2010 | Nooren | |

FOREIGN PATENT DOCUMENTS

| | | |
|---|---|---|
| EP | 1 705 885 A1 | 9/2006 |
| KR | 10-0600335 | 7/2006 |
| KR | 10-2008-0054737 | 6/2008 |
| KR | 10-2008-0111175 | 12/2008 |
| WO | WO 99/49686 A2 | 9/1999 |
| WO | WO 01/06679 A1 | 1/2001 |
| WO | WO 02/39765 A1 | 5/2002 |
| WO | WO 02/063849 A1 | 8/2002 |
| WO | WO 02/078381 A1 | 10/2002 |
| WO | WO 03/001770 A2 | 1/2003 |
| WO | WO 03/088690 A1 | 10/2003 |
| WO | WO 2004/100470 A1 | 11/2004 |
| WO | WO 2004/104735 A2 | 12/2004 |
| WO | WO 2004/105405 A2 | 12/2004 |
| WO | WO 2007/080570 A1 | 7/2007 |
| WO | WO 2007/141762 A1 | 12/2007 |
| WO | WO 2008/085830 A1 | 7/2008 |
| WO | WO 2008/130565 | 10/2008 |
| WO | WO 2010/094038 A2 | 8/2010 |

OTHER PUBLICATIONS

Non-Final Official Action for U.S. Appl. No. 11/809,200 (Jul. 19, 2011).
First Office Action for Chinese Patent Application No. 200780048418.8 (Jun. 15, 2011).
Interview Summary for U.S. Appl. No. 11/809,200 (May 10, 2011).
Summons to attend oral proceedings pursuant to Rule 115(1) EPC for European application No. 04751900.4 (Mar. 21, 2011).
Final Official Action for U.S. Appl. No. 11/809,200 (Feb. 16, 2011).
Final Official Action for U.S. Appl. No. 11/903,507 (Dec. 10, 2010).
Interview Summary for U.S. Appl. No. 11/809,200 (Nov. 29, 2010).
Communication pursuant to Article 94(3) EPC for European Application No. 04 751 900.4 (Oct. 4, 2010).
Notification of Transmittal of the International Search Report and the Written Opinion of the International Searching Authority, or the Declaration for International Application No. PCT/US2010/024317 (Oct. 4, 2010).
Official Action for U.S. Appl. No. 11/903,507 (Aug. 10, 2010).
Official Action for U.S. Appl. No. 11/809,200 (Jun. 23, 2010).
Final Official Action for U.S. Appl. No. 11/809,200 (Jan. 25, 2010).
Interview Summary for U.S. Appl. No. 11/809,200 (Oct. 29, 2009).
Communication of European publication number and information on the application of Article 67(3) EPC for European Patent No. 2084861 (Jul. 8, 2009).
Official Action for U.S. Appl. No. 11/809,200 (Jun. 1, 2009).
Notification of Transmittal of the International Search Report and the Written Opinion of the International Searching Authority, or the Declaration for International Application No. PCT/US2008/000038 (May 21, 2008).
Notification of Transmittal of the International Search Report and the Written Opinion of the International Searching Authority, or the Declaration for International Application No. PCT/US07/22440 (Mar. 14, 2008).
Notice of Allowance and Fee(s) Due for U.S. Appl. No. 10/844,149 (Sep. 21, 2007).
Advisory Action for U.S. Appl. No. 10/844,149 (Mar. 19, 2007).
Final Official Action for U.S. Appl. No. 10/844,149 (Aug. 11, 2006).
Notification of Transmittal of the International Search Report and the Written Opinion of the International Searching Authority, or the Declaration for International Application No. PCT/US2004/014734 (Feb. 10, 2006).
Official Action for U.S. Appl. No. 10/844,149 (Dec. 14, 2005).
"Digital Cellular Telecommunications System (Phase 2+); Mobile Application Part (MAP) Specificiation (3GPP TS 09.02 Version 7.15.0 Release 1998)," GSM (Global System for Mobile Communications), ETSI TS 100 974, V7.15.0, pp. 1-558 (Mar. 2004). (Part 1 of 2).
"Digital Cellular Telecommunications System (Phase 2+); Mobile Application Part (MAP) Specificiation (3GPP TS 09.02 Version 7.15.0 Release 1998)," GSM (Global System for Mobile Communications), ETSI TS 100 974, V7.15.0, pp. 559-1117 (Mar. 2004). (Part 2 of 2).
Roach, "Session Initiation Protocol (SIP)—Specific Event Notification," Network Working Group, RFC 3265 (Jun. 2002).
"3rd Generation Partnership Project; Technical Specification Group Terminals; Technical Realization of the Short Message Service (SMS) (Release 1998)," 3GPP TS 03.40 V7.5.0, pp. 1-118 (Dec. 2001).
"Push Access Protocol," Wireless Application Protocol, WAP-247-PAP-20010429.a, Version Apr. 29, 2001, pp. 1-49 (Apr. 29, 2001).
"3rd Generation Partnership Project; Technical Specification Group Terminals; Technical Realization of Cell Broadcast Service (CBS) (Release 1998)," 3GPP TS 03.41 V7.4.0, pp. 1-31 (Sep. 2000).
First Office Action for Chinese Patent Application No. 200780048199.3 (Nov. 25, 2011).
Interview Summary for U.S. Appl. No. 11/809,200 (Nov. 2, 2011).

* cited by examiner

METHODS, SYSTEMS, AND COMPUTER PROGRAM PRODUCTS FOR PROVIDING A CALL ATTEMPT TRIGGERED MESSAGING SERVICE IN A COMMUNICATIONS NETWORK

RELATED APPLICATIONS

The present application claims the benefit of U.S. Provisional Patent Application Ser. No. 60/854,652, filed Oct. 26, 2006; the disclosure of which is incorporated herein by reference in its entirety.

TECHNICAL FIELD

The subject matter described herein relates to providing a messaging service in a communications network. More particularly, the subject matter described herein relates to methods, systems, and computer program products for providing a call attempt triggered messaging service in a communications network.

BACKGROUND

Presently, providers of goods and services must often rely on traditional methods for advertising and distributing coupons to potential customers. Television commercials, radio segments, Internet advertisements, and newspaper circulars are a few examples of the current methods in which businesses attempt to communicate with and attract prospective buyers. However, these manners of advertising may be considered inefficient due to being too dispersed and not targeted to a pertinent customer. Notably, these current methods for advertising fail to take advantage of recent technological features and capabilities afforded by mobile phones, personal digital assistants (PDAs), smart phones, and like devices. More specifically, these personal communication devices are capable of providing a seller the opportunity to immediately communicate with a potential buyer in a more direct and focused manner using messaging service messages or electronic mail (e-mail).

Current methods used to send targeted ads to mobile services include location-based services that send ads to a mobile phone when the mobile phone enters a geographic area. Such ads relate to businesses within the geographic area so that the mobile phone user will purchase a good or service from one of the businesses. However, one problem with location-based advertising to mobile devices is that such advertising does not take into account interests of the prospective buyer. Location-based ads may even be viewed as spam and may be deleted by the prospective buyer.

Accordingly, there exists a need for improved methods, systems, and computer program products for providing a call attempt triggered messaging service in a communications network.

SUMMARY

The subject matter described herein comprises methods, systems, and computer program products for providing a call attempt triggered messaging service in a communications network is described. One method includes the intercepting of a call signaling message that includes a calling party subscriber identifier and a called party subscriber identifier. A call attempt triggered message generation (CATMG) database using the called party subscriber identifier is queried. In the event the called party subscriber identifier exists in the CATMG database, a messaging service message is generated. The messaging service message is then transmitted to a contact address.

The subject matter described herein for providing a call attempt triggered messaging service may be implemented using a computer program product comprising computer executable instructions embodied in a computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for providing a call attempt triggered messaging service described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

The present subject matter relates to systems and methods for providing a call attempt triggered message generation (CATMG) service in a communications network. According to one aspect of the present subject matter, a CATMG service includes receiving or intercepting a call setup signaling message (e.g., SS7 ISUP IAM message, SIP Invite message, etc.) during transit through a communications network and subsequently generating a messaging service message (e.g., a short messaging service (SMS) message, an instant message, a multimedia messaging service message, an electronic mail message, etc.) in response to receiving or intercepting the call setup signaling message or any other similar attempt to establish a call.

Although the examples presented herein are associated with the reception (or interception) of SS7 ISUP call signaling messages and SS7 ISUP call signaling messages sent using SIGTRAN protocols, those skilled in the art realize the present subject matter is not limited to SS7 and SIGTRAN implementations. For instance, the present subject matter may be implemented in various signaling networks that employ non-SS7 signaling protocols, such as session initiation protocol (SIP).

Figure 1:
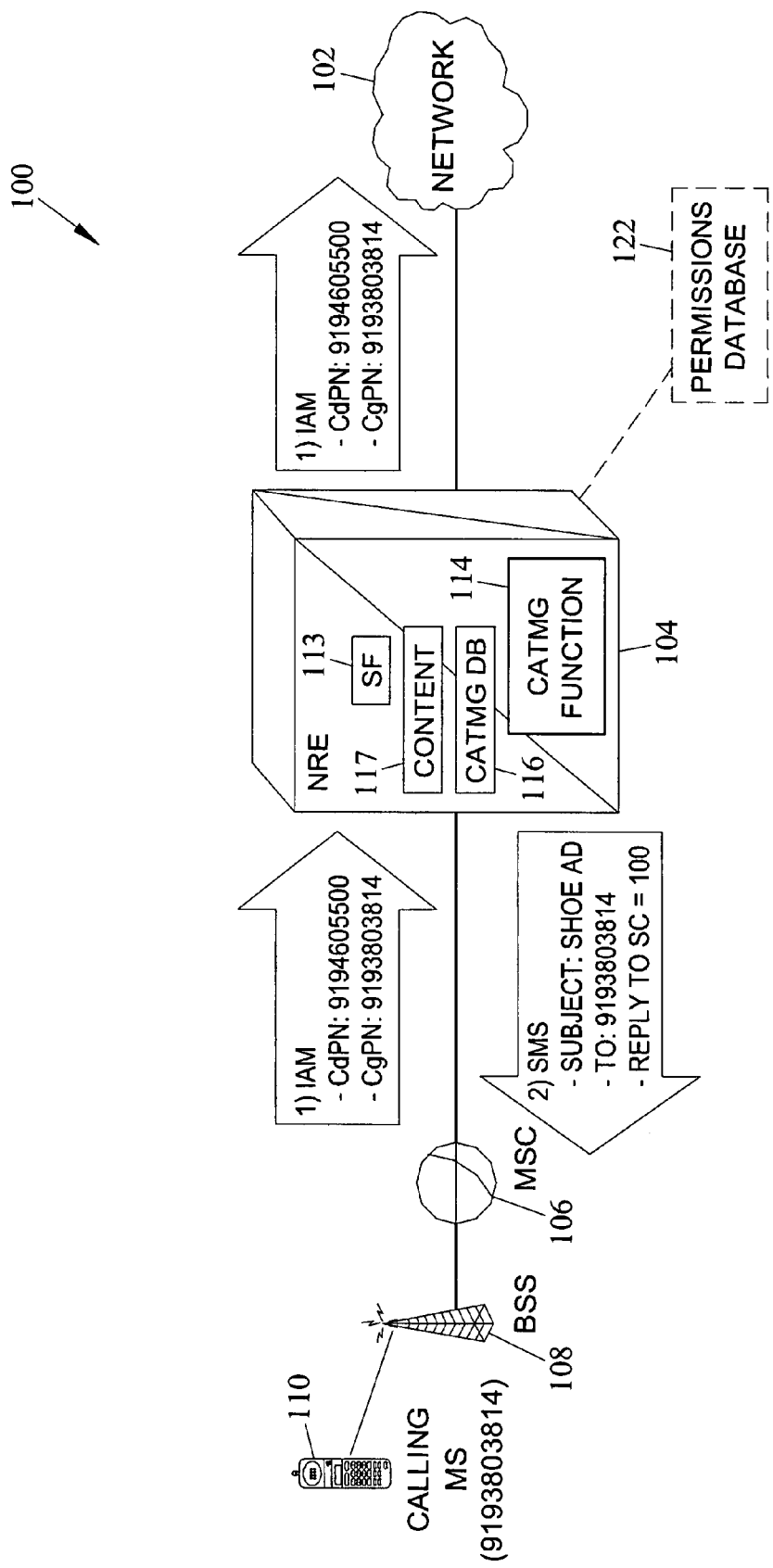
FIG. 1 is an exemplary communications network utilizing a call attempt triggered messaging service system according to an embodiment of the subject matter described herein.

FIG. 1 depicts an exemplary communications network 100 for providing a CATMG service according to one embodiment of the subject matter described herein. Referring to FIG. 1, network 100 may include a telecommunications computer network 102 (e.g., the Internet), a network routing element 104, a mobile switching center (MSC) 106, a base station system (BSS) 108, and a calling mobile station (MS) 110. In one embodiment, network routing element 104, which may comprise a signal transfer point (STP), an SS7-IP signaling gateway (SG), a SIP server, IP multimedia subsystem (IMS) node, or any other like network component, is adapted to receive and route call setup signaling messages (e.g., SS7 ISUP or SIP signaling messages). In an alternate embodiment, the functions performed by network routing element 104 may be executed by an end office. Network routing element 104 includes a CATMG function 114, which may be responsible for handling the CATMG processing of call setup signaling messages for network routing element 104. Among other capabilities, CATMG function 114 may be configured to generate, address, and subsequently transmit a response message, such as a messaging service message (e.g., an SMS message), to a contact address associated with the source of the intercepted message. In one embodiment, the contact address may include an email address, an identifier number (e.g., a calling party identifier, called party identifier number, or any phone number), a uniform resource identifier (URI) address, instant messaging (IM) address, IP address, and the like. Furthermore, the contact address may be associated with any one of the calling party, the called party, or even a third party depending on the application of the present subject matter.

Figure 2:
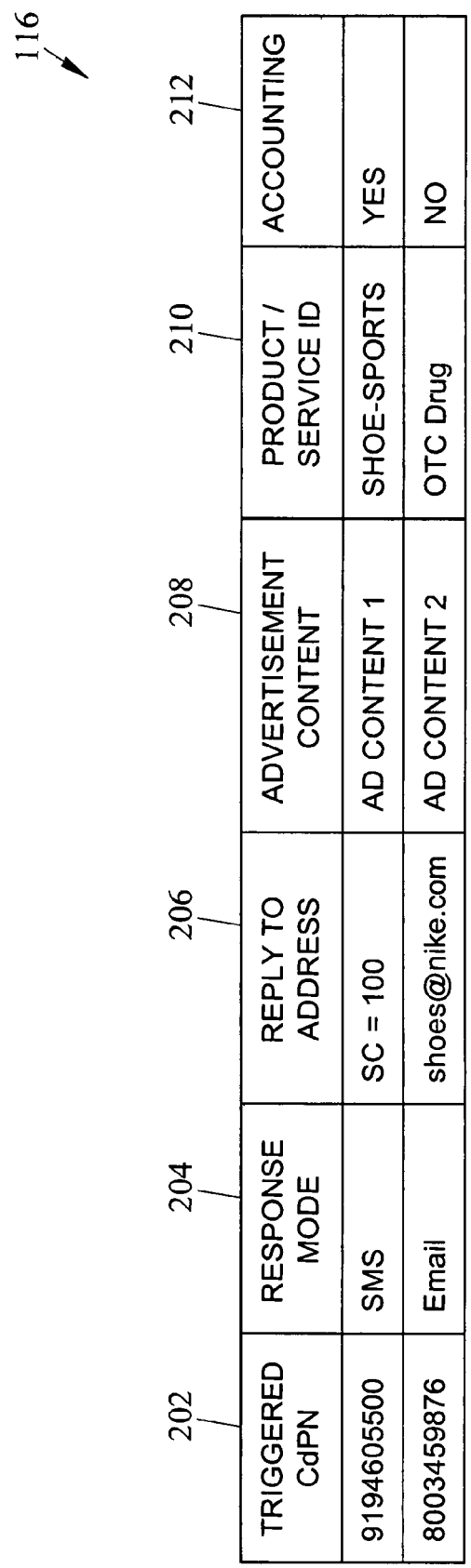
FIG. 2 is an exemplary call attempt triggered message generation (CATMG) rules database structure according to an embodiment of the subject matter described herein.

Network routing element 104 also includes a CATMG rules database 116 that contains a listing of number identifiers of various persons, companies, and/or other entities that subscribe to the messaging service. For example, database 116 may contain a listing of identifier numbers that correspond to companies that desire advertisement content or a coupon to be sent to a calling party that attempts to call a predefined number (which is stored in database 116 and is unique to each company). An exemplary CATMG rules database 116 is depicted in FIG. 2. Generally, the CATMG rules database 116 contains a list of targeted called party numbers and specific CATMG actions associated with each targeted number. Referring to FIG. 2, each entry of database 116 may include a triggered called party number field 202, a response mode field 204, a "reply to" address field 206, an advertisement content field 208, a product/service identification field 210, and an accounting field 212. Those skilled in the art realize that the entries of database 116 may have different types or a different number of fields than those depicted in FIG. 2. Triggered call party number field 202 contains the number identifier (e.g., a phone number) of a CATMG subscribing entity. Response mode field 204 indicates the mode or manner in which the CATMG function 116 will respond to the calling party if a call attempt to the triggered call party number is made. Reply to address field 206 indicates the manner by which the calling party may respond in order to obtain more information or coupons. Advertisement content field 208 contains an indicator of the type of data is provided or incorporated in the response message to the calling party. Product/service field 210 denotes the area of business the subscribing entity is involved in. Accounting field 212 indicates whether or not the called party requires an accounting record to be generated for a call attempt triggered message service transaction. Network routing element 104 also hosts a screening function 113, which is used for querying CATMG database 116.

Network routing element 104 may also host a content database 117 that contains the companies' respective coupons, advertisement content, and other similar data. CATMG function 114 utilizes content database 117 as the source of the content that is ultimately incorporated into the generated response messages (e.g., SMS messages, email messages, etc.). In one embodiment, content database 117 may also co-exist with CATMG database 114 in a common database on network routing element 104. In an alternate embodiment, content database 117 can be stored on a separate computer as opposed to residing locally on network routing element 104. Similarly, in an alternate embodiment, network routing element 104 may contain, or be coupled to, permissions database 122. Permissions database 122 may contain a listing of calling party subscribers that have provided permission to receive messaging service messages (or other response messages) from network routing element 104.

Figure 3:
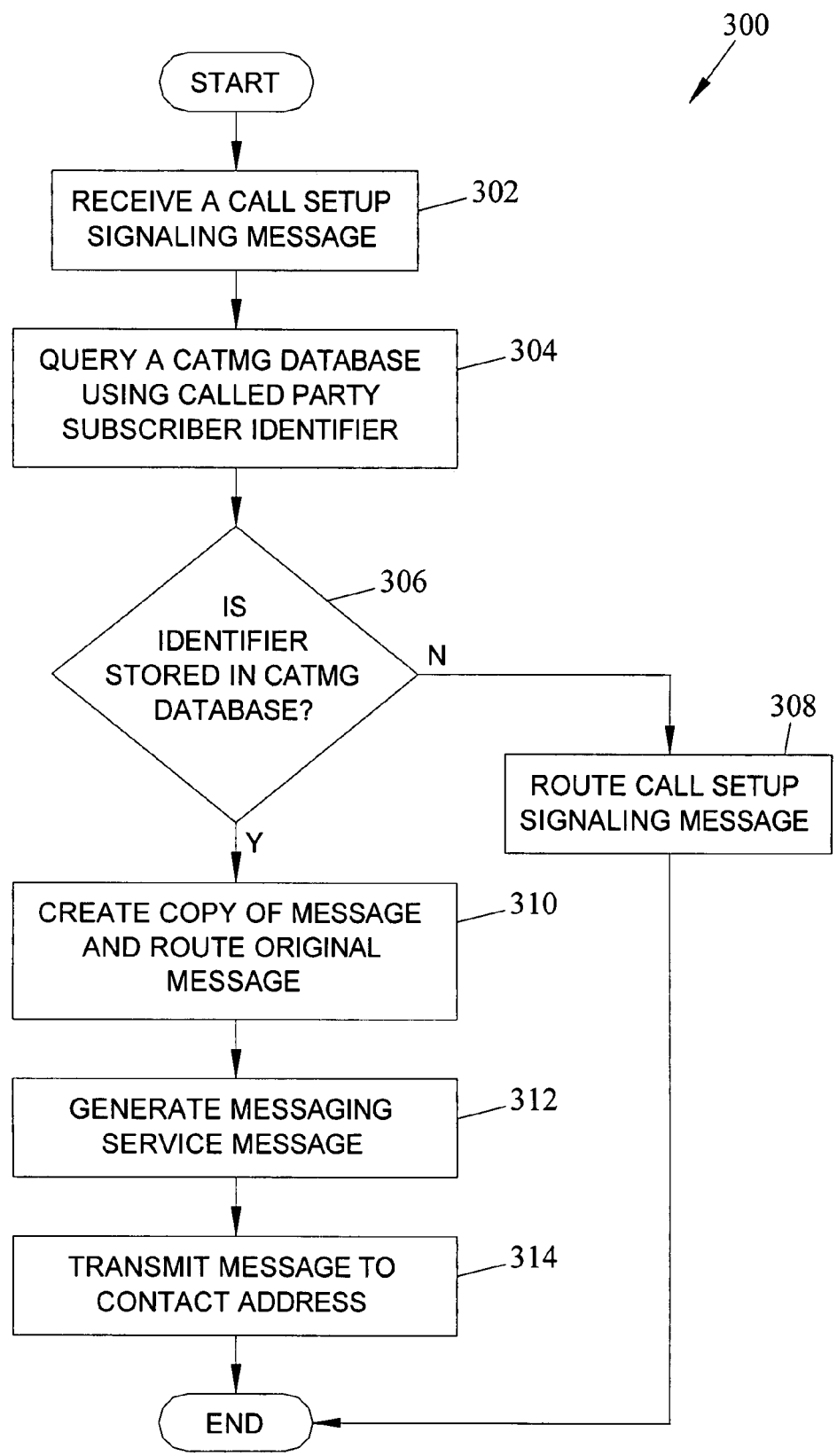
FIG. 3 is a flow chart illustrating exemplary steps for providing a call attempt triggered messaging service in a communications network according to an embodiment of the subject matter described herein.
Figure 4:
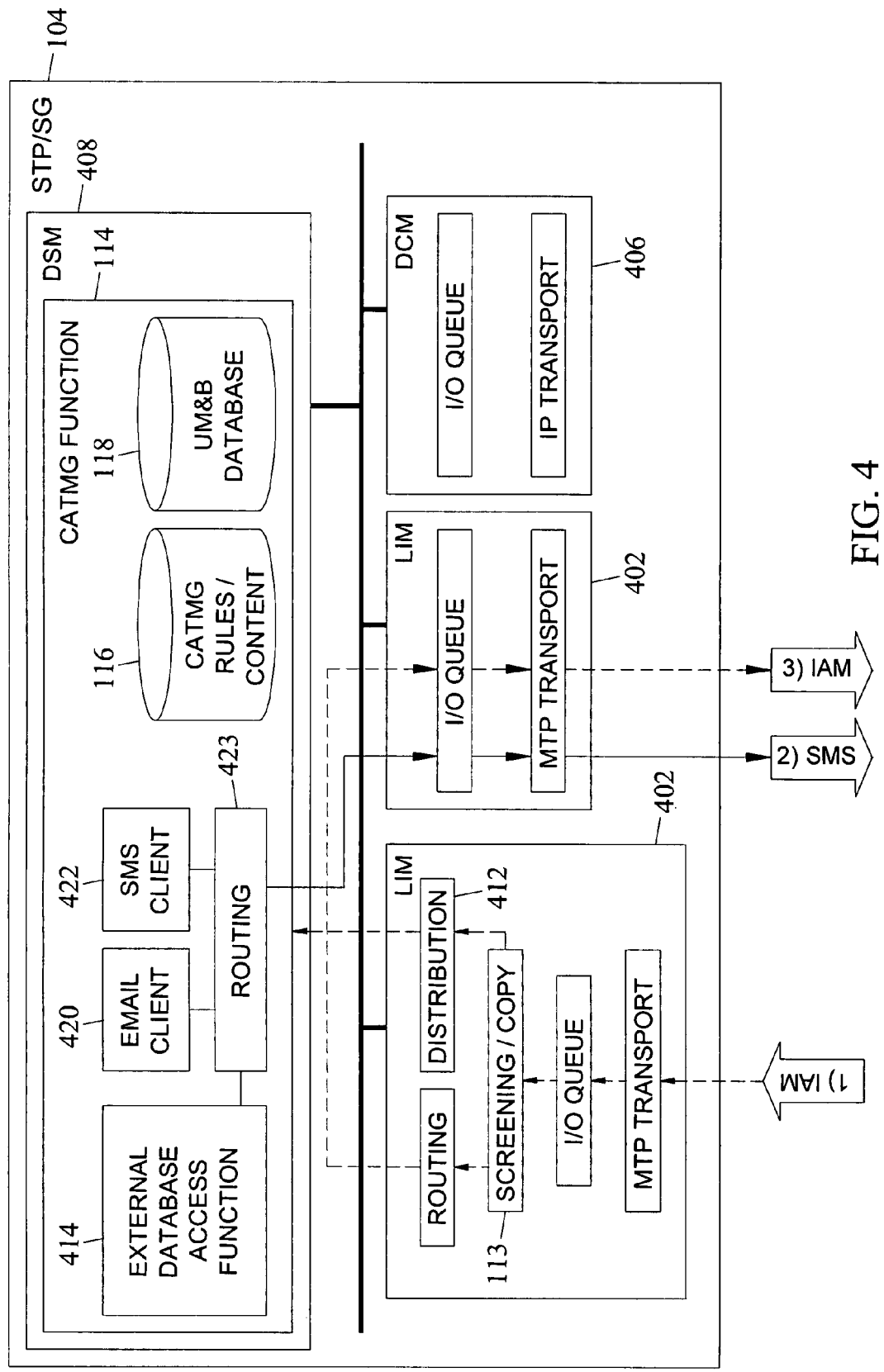
FIG. 4 depicts exemplary architecture of a network routing element configured to generate a call attempt triggered message in a communications network according to an embodiment of the subject matter described herein.

FIG. 3 is a flow chart that depicts an exemplary method 300 for providing a CATMG service in communications system 100 according to an embodiment of the subject matter described herein. Referring to FIG. 3, in block 302, network routing element 104 receives (or intercepts) a call setup signaling message from MS 110. In one embodiment, the call setup signaling message comprises an ISUP IAM (ISDN user part initial address message) associated with a call attempt from a calling party using MS 110. The call setup signaling message received by network routing element 104 may contain both a calling party identifier number (e.g., 919-380-3814) and a called party identifier number (e.g., 919-460-5500 or a toll-free number). In one embodiment, the call setup message may be received by a SS7 link interface communication module (LIM) 402 that resides on network routing element 104, as depicted in FIG. 4 (which is discussed in greater detail below).

In block 304, a called party subscriber database (i.e., CATMG rules database 116) is queried using the called party identifier. In one embodiment, screening function 113 may be adapted to utilize the called party identifier in the received call setup signaling message to query (or access) CATMG rules database 116 in order to determine if the CATMG service is to be performed. For example, after network routing element 104 receives a call setup message intended for 919-460-5500, screening function 113 queries CATMG rules database 116 to ascertain if 919-460-5500 is an entry that can "trigger" the CATMG service.

In block 306, a determination as to whether the identifier number is stored in CATMG rules database 116 is made. If the identifier number is not listed in CATMG rules database 116, then method 300 continues to block 308 where the call setup signaling message is routed in a conventional manner. If the identifier number is located in CATMG rules database 116, then the method 300 proceeds to block 310 where a copy of the call setup signaling message is made by screening function 113 and the original call setup signaling message is then routed in a conventional manner (i.e., the original call setup signaling message is not retained). In one embodiment, the determination process comprises a LIM-based screening process (e.g., screening function 113) that ascertains whether the call setup signaling message contains a "triggered" number. Triggered called party number information (e.g., an identifier number) may be maintained at CATMG rules database 116 within network routing element 104 and accessed by a LIM-based screening function.

In block 312, a response message (e.g., a messaging service message, email message, instant message, etc.) is generated. In one embodiment, CATMG function 114 generates an SMS message in response to the determination that the called party identifier is located in CATMG rules database 116. Notably, CATMG function 114 addresses the SMS message to the calling party subscriber identifier (e.g., the calling party number) that was located in the originally received call setup signaling message. During the generation process, CATMG function 114 may include a coupon, advertisement content, and/or any other type of data in the SMS message. The content data may be obtained from a local content database 120 (see FIG. 1) or may be acquired from a database hosted by a separate computer, such as a dedicated content server (not shown). For example, CATMG function 114 may create an SMS message that comprises an advertisement for subscriber Company A's products and addresses the message to 919-380-3814, which is the original calling party's identifier number (i.e., telephone number). CATMG function 114 accesses database 120 for the desired advertisement content (e.g., content predefined by Company A) and incorporates the data into the SMS message. The generated SMS message may also include a short code (SC) address to which the receiving MS 110 can reply back if the calling party is interested in obtaining additional information or coupons.

In block 314, the response message is transmitted to a contact address. In one embodiment, network routing element 104 transmits the SMS message (generated in block 312) to the contact address contained within the SMS message (i.e., the calling party identifier 919-380-3814). The method 300 then ends.

In one embodiment, the method 300 may only be performed if the calling party is a subscriber to the CATMG service as well. For example, network routing element 104 may be adapted to access permissions database 122 to determine if the calling party is a subscriber to the CATMG service prior to generating the messaging signal message. If the calling party's identifier number is stored in permissions database 122, then method 300 is executed normally. Conversely, if the subscriber's identifier number cannot be located in permissions database 122, then method 300 is not permitted to be performed.

Shown in FIG. 4 is an exemplary internal architecture of a network routing element 104 (e.g., STP/SG/SMG) that may be used with embodiments of the present subject matter. Network routing element 104 includes one or more SS7 link interface communication modules (LIMs) 402 that are adapted to send and receive SS7 messages, including SS7 MAP SMS messages. Each LIM 402 includes a screening function 113 that is adapted to identify SMS messages that may require CATMG function processing. Network routing element 104 comprises a database services module (DSM) 408 which may host CATMG function 114. The LIM-based screening function 113 may route the intercepted call setup signaling message (e.g., IAM message) from network routing element 104 to (or towards) its original destination. Similarly, screening function 113 may generate a copy of the setup message and forward it to the DSM 408 for further processing. CATMG rules database 116 is accessed using the called party identifier number to determine the appropriate CATMG action to be taken. Referring back to FIG. 1, a CATMG action may include generating an SMS advertisement message (via SMS client/message generation function 422 that is associated with CATMG function 114) that is addressed to the calling party number specified in the intercepted call setup message. The SMS message may include a short code (e.g., SC=100) to which the recipient subscriber may respond. Also, an email client 420, which resides on CATMG function 114, is adapted to generate email messages. A routing function 423 is adapted to provide network routing rules/information/policy for email, SMS and other messaging service messages. A usage measurements and billing (UM&B) database 118 is adapted to maintain usage measurements and billing information for enriching service transactions.

CATMG rules database 116 is adapted to maintain triggered called party numbers and associated data and actions. In one embodiment of the subject matter, CATMG rules database 116 may include, for each entry, a subscriber permission field that indicates whether a calling subscriber has provided permission to receive automatically generated message service messages in response to call attempts by the calling subscriber. If the subscriber permission field indicates that the calling party permits the generation and reception of a message service message, then a message may be generated and sent to the calling subscriber when the calling subscriber initiates a call to a targeted number. If the permission field indicates that the subscriber does not permit an automatic SMS generation, then such generation may not occur.

In an alternate implementation, a separate subscriber permission database 122 may be maintained to determine whether or not a calling subscriber permits or does not permit automatic SMS message generation in response to call attempts by the subscriber.

Figure 5:
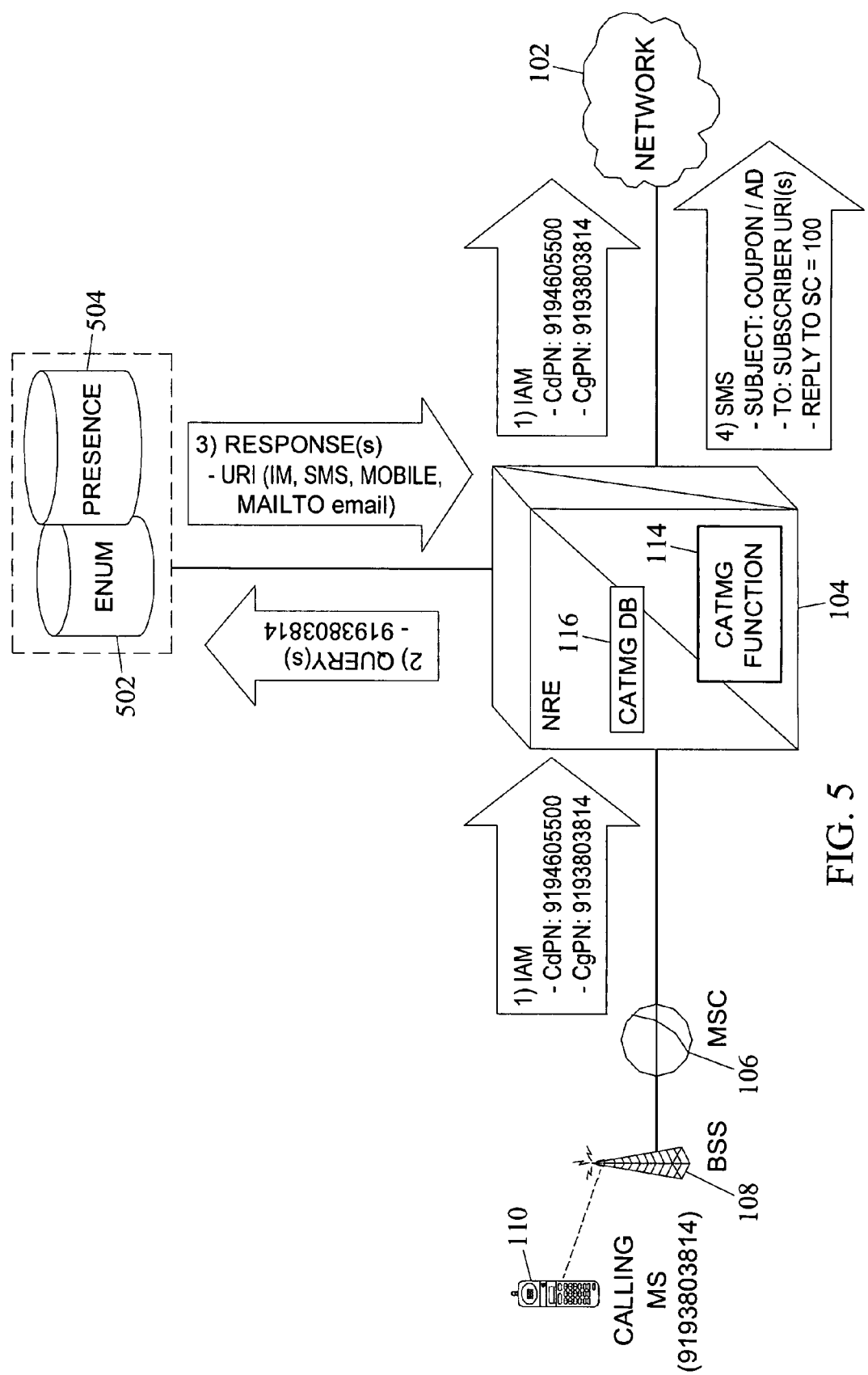
FIG. 5 depicts the exemplary communications network shown in FIG. 1 and the transmission of a triggered messaging signal to an alternate address associated with a calling party according to an embodiment of the subject matter described herein.

The present subject matter may also be implemented in a manner where the SMS message is transmitted to a device that is not associated to the subscriber identifier specified in the received call setup signaling message (e.g., the response message is not sent back to a calling party's cellular phone, which was used to make the initial call). In one embodiment, as illustrated in FIG. 5, an intercepted IAM call setup signaling message triggers the generation of an SMS message. However, the SMS message is addressed to a number contact address associated with the calling party that differs from the address (i.e., calling party number) contained in the intercepted call setup message. This embodiment may be realized if the calling party subscribes to an ENUM service. CATMG function 114 may be adapted to query an ENUM database 502 using the calling party number contained in the intercepted IAM message for the purpose of obtaining an alternate calling party contact address(es). Namely, by providing ENUM database 502 with the calling party subscriber identifier, several URIs or other contact addresses associated to the subscriber may be acquired (e.g., email address, instant messenger address, alternate phone number, and the like) by the CATMG function 114. Consequently, CATMG function 114 may then send the coupon, advertisement information, or other like data to one or more of the obtained URIs. In an alternate embodiment, a presence database 504 may be used in conjunction with ENUM database 502, such that CATMG function 114 is subsequently enabled to transmit the coupon, advertisement data, or the like to URI destinations that are currently available or are being used by the subscriber. For example, if queries to ENUM database 502 and presence database 504 indicate that a "MAIL TO" URI or email address is a present and available means to contact the subscriber, an email message is subsequently generated by CATMG function 114 and sent to the "MAILTO" URI/email address.

In one exemplary implementation of the above embodiment, CATMG function 114 is adapted to maintain call attempted triggered messaging rules that may be specified by a parent or guardian with respect to their child. For example, CATMG function 114 may contain a call attempt triggered messaging rule which specifies that an SMS message is to be sent to a parent subscriber (or any designated third party) when his (or her) child attempts a call to a predetermined number (e.g., a 900 number, a number that a parent has placed on a restricted list or "blacklist" for that child, etc.). The SMS message may contain information that identifies the called party number as well as date/time stamp information. It is further appreciated that the same basic call attempt triggered message generation can be used to notify a parent or guardian when a "blacklisted" calling party is attempting to call their child. That is, CATMG function 114 may contain a call attempt triggered messaging rule which specifies that an SMS message is to be sent to a parent subscriber (or any designated third party) when a number/subscriber identifier (e.g., POTS number, SIP URI, etc.) that a parent has placed on a restricted list or "blacklist" for that child attempts to place a call to the child. It is appreciated that in various embodiments of the present subject matter, more complex CATMG rules may be specified. For example, rules may be specified in CATMG rules database 116 that dictate a predefined time period limitation, such as a day of week and/or time of day call attempt limitations. For example, a parent may wish to be notified of any call attempts made by their child during school hours, or any call attempts made by their child after 11 pm, etc.

With regard to these embodiments, it is appreciated that CATMG function 114 may, in addition to generating and transmitting a call attempt triggered messaging service message, enforce "blacklist" rules by blocking or terminating a call setup to a called party that is specified in the restricted list or "blacklist". For example, CATMG function 114 may intercept an ISUP IAM message associated with call attempt to a "blacklisted" called party. CATMG function 114 may subsequently generate and transmit a messaging service message to a predetermined party (e.g., the parent subscriber) and additionally may discard the IAM message. In one embodiment, an associated ISUP release message may also be generated and transmitted by CATMG function 114. In this manner, not only is the parent notified of the child's attempt to call a "blacklisted" number, but the call attempt is ultimately denied.

Figure 6:
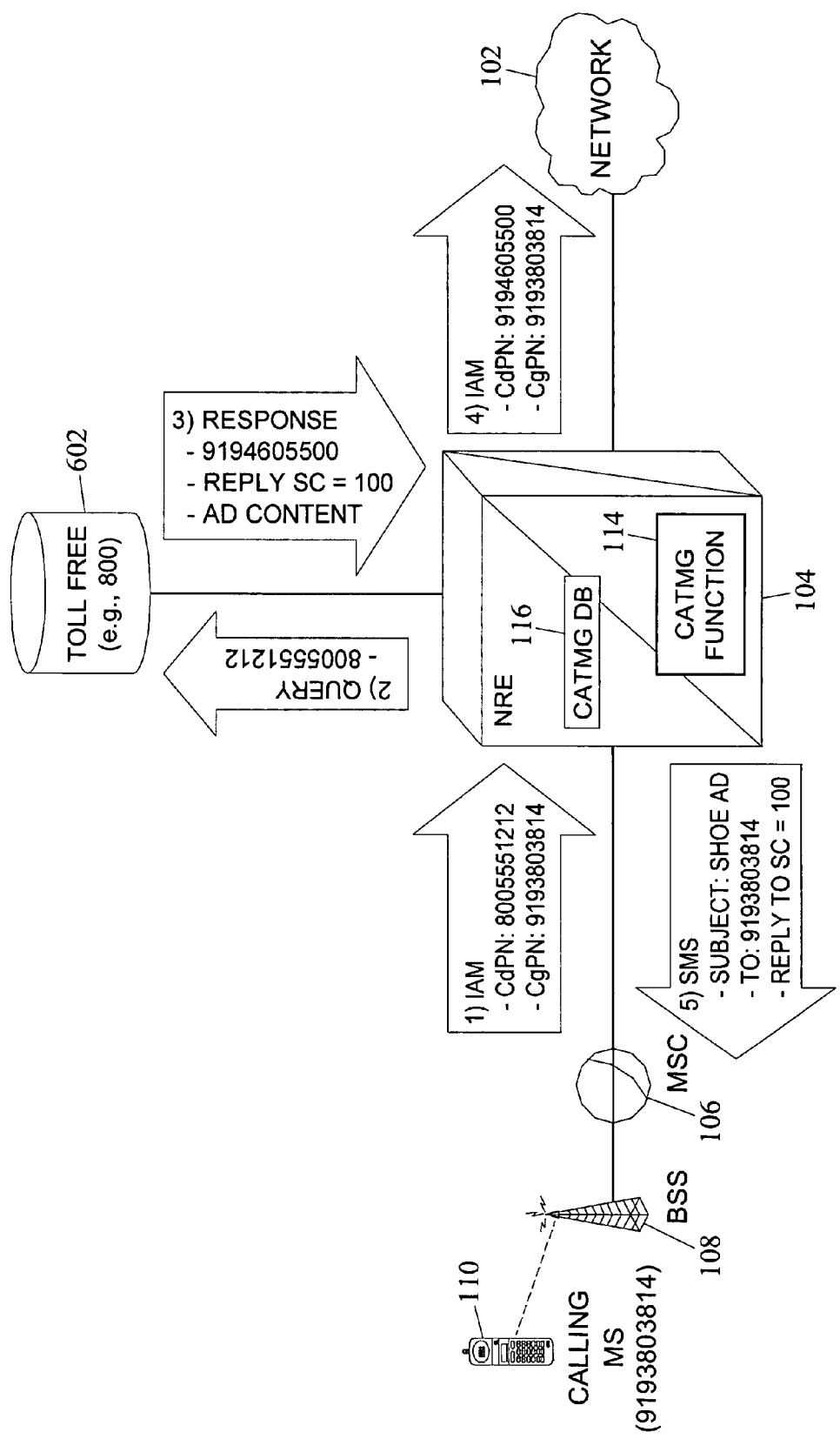
FIG. 6 depicts the exemplary communications network shown in FIG. 1 and the storing of data content in a toll-free database according to an embodiment of the subject matter described herein.

In yet another embodiment, the present subject matter may be implemented with a toll free (e.g., 800 number service) database 602. As illustrated in FIG. 6, at least a portion of the CATMG rules/content is maintained by a toll free database 602. Network routing element 104 intercepts a call setup signaling message, such as a Bearer Independent Call Control (BICC) ISUP IAM message, which is addressed to a called party number (CdPN) that is a toll free number. Network routing element 104 queries toll free database 602 to translate the toll free number into a "routable" number. Afterwards, network routing element 104 receives both number translation information from the toll free database 602, as well as coupons, advertising content, and like data for an SMS message. CATMG function 114 associated with network routing element 104 generates and subsequently transmits the SMS message.

As an example of how a coupon can be provided to a calling party, FIG. 6 depicts calling mobile station 110 initiating a call to contact a 1-800 number associated with a particular shoe vendor. A call signaling message (e.g., message 1) representing the call is received by NRE 104. NRE 104 obtains called party information (e.g., the toll free number) from the received call signaling message and uses the called party information to send a query (e.g., message 2) to a toll free database 602 that contains routable numbers to a plurality of business entities. NRE 104 then receives a response (e.g., message 3) from toll free database 602 that includes various forms of information. For example, the response may contain a local "routable" number associated with the dialed toll free number, a reply short code, and ad content. In one embodiment, ad content may include a coupon from the business entity associated with the dialed 1-800 number. Upon receiving the response message, NRE 104 may use the local "routable" number to create a new call signaling message (e.g., message 4) in order to establish the initially requested connection. Similarly, NRE 104 may generate an SMS message (e.g., message 5) that includes a shoe advertisement and/or coupon addressed to the original calling party. If the original calling party is interested, the SMS message also includes a short code that the calling party may use to promptly respond if interested in obtaining additional information or coupons. As mentioned previously, the present subject matter may be implemented in communication networks other than SS7/SIGTRAN-based networks. For example, the present subject matter may be implemented in a SIP-based communications network. In one such SIP network embodiment, call attempt triggered messaging may be accomplished using a SIP subscribe/notify method. See IETF RFC 3265 *Session Initiation Protocol (SIP)—Specific Event Notification* for a detailed discussion of SIP subscribe/notify methodology. Using a CATMG function similar to that previously described, a first subscriber may "subscribe" to call attempts made by a second subscriber using the SIP subscribe method. The first subscriber is notified of a call attempt by the second subscriber using the SIP notify method.

For example, by using an application on a mobile handset, mobile computing device, personal computer, etc., a parent of a child may register with CATMG function 114 to receive a notification each time the child attempts a call to a "900" number service. This registration may be accomplished using a SIP subscribe method message. The SIP subscribe method message may include the telephone number or URI associated with the child (e.g., the child's mobile phone number), the "blacklisted" number(s) (or a restricted number range) or URI(s) that the child is not allowed to call. The SIP subscribe method message may also include a contact address (e.g., MAILTO:URI, IM:URI, MMS:URI, etc.) to which the notification message is to be sent in the event the child attempts to call one of the "blacklisted" numbers or URIs. In one embodiment, CATMG function 114 maintains the subscription request and associated rule. In the event that a call attempt to one of the "blacklisted" numbers or URIs is made by the child, CATMG function 114 is adapted to notify the parent (at the specified contact address) using a SIP Notification method message. It is appreciated that methods and messages other than the exemplary SIP subscribe/notify methods may be used to accomplish the same function in a SIP/IMS network environment, and that the present subject matter is not limited to implementations that utilize SIP subscribe/notify methodologies.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for providing a call attempt triggered messaging service in a communications network, the method comprising steps of:

interceptinga call signaling message including a calling party subscriber identifier and a called party subscriber identifier;

querying a call attempt triggered message generation (CATMG) database using the called party subscriber identifier;

generating a messaging service message if the called party subscriber identifier exists in the CATMG database, wherein the messaging service message includes at least one of a short messaging service (SMS) message, an email message, an instant message service message, and a multimedia messaging service message; and transmitting the messaging service message to a contact address.

2. The method of claim 1 wherein the contact address is associated with the calling party subscriber identifier.

3. The method of claim 1 wherein the contact address includes at least one of a calling party subscriber identifier and a contact address obtained from an ENUM database.

4. The method of claim 1 wherein transmitting the messaging service message includes:

transmitting the messaging service message to a third party associated with the calling party subscriber identifier if the called party subscriber identifier has been designated as a restricted number by the third party.

5. The method of claim 4 comprising:

discarding the call signaling message if the called party subscriber identifier is the restricted number.

6. The method of claim 4 wherein the messaging service message informs the third party that the restricted number has been called.

7. The method of claim 1 wherein the messaging service message is generated by incorporating data obtained from a content database into the messaging service message, wherein the data is specified by the CATMG database.

8. The method of claim 7 wherein at least a portion of the content database is maintained by a toll free database.

9. The method of claim 1 wherein transmitting the messaging service message includes:

transmitting the messaging service message to a third party associated with the calling party subscriber identifier if the call signaling message is originated during a time period indicated in the CATMG database.

10. The method of claim 9 wherein the time period includes at least one of a predefined time range and a day of the week.

11. The method of claim 1 further comprising:

querying an E.164 number (ENUM) server to locate at least one uniform resource identifier (URI) associated with the calling party subscriber identifier;

receiving the at least one URI from the ENUM server; and transmitting the messaging service message to the at least one URI.

12. The method of claim 11 wherein the at least one URI is received from the ENUM server if a presence server indicates that the at least one URI is available.

13. A method for providing a call attempt triggered messaging service in a communications network, the method comprising steps of:

intercepting a call signaling message including a calling party subscriber identifier and a called party subscriber identifier;

querying a call attempt triggered message generation (CATMG) database using the calling party subscriber identifier and the called party subscriber identifier;

generating a messaging service message if the calling party subscriber identifier is designated as a restricted number with regard to the called party subscriber identifier in the CATMG database, wherein the messaging service message includes at least one of a short messaging service (SMS) message, an email message, an instant message service message, and a multimedia messaging service message; and transmitting the messaging service message to a contact address.

14. A method for providing a call attempt triggered messaging service in a communications network, the method comprising steps of:

intercepting a call signaling message including a calling party subscriber identifier and a called party subscriber identifier;

querying a call attempt triggered message generation (CATMG) database using the calling party subscriber identifier;

generating a messaging service message if the calling party subscriber identifier exists in the CATMG database, wherein the messaging service message includes at least one of a short messaging service (SMS) message, an email message, an instant message service message, and a multimedia messaging service message; and transmitting the messaging service message to a contact address.

15. A network routing element for providing a call attempt triggered messaging service in a communications network, comprising:

a screening function for intercepting a call signaling message associated with a call including calling and called party information and searching a call attempt triggered message generation (CATMG) database using at least a portion of the calling and called party information to determine whether a call attempt trigger has been set for the call; and a CATMG function for generating a messaging service message in response to the call attempt trigger being set for the call, and transmitting the messaging service message to a contact address, wherein the messaging service message includes at least one of a short messaging service (SMS) message, an email message, an instant message service message, and a multimedia messaging service message.

16. The network routing element of claim 15 wherein the contact address includes one of the calling party subscriber identifier and a contact address obtained from an ENUM database based on the calling party subscriber identifier.

17. The network routing element of claim 15 wherein the messaging service message is generated by incorporating data obtained from a content database into the messaging service message, wherein the data is specified by the CATMG database.

18. The network routing element of claim 17 wherein at least a portion of the content database is maintained by a toll free database.

19. The network routing element of claim 15 wherein the CATMG function is adapted to query an E.164 number (ENUM) server to locate at least one uniform resource identifier (URI) associated with the calling party subscriber identifier, receive the at least one URI from the ENUM server, and transmit the messaging service message to the at least one URI.

20. The network routing element of claim 19 wherein the at least one URI is received from the ENUM server if a presence server indicates that the at least one URI is available.

21. A computer program product comprising computer executable instructions embodied in a non-transitory computer readable medium for performing steps comprising:

intercepting a call signaling message including a calling party subscriber identifier and a called party subscriber identifier; querying a call attempt triggered message generation (CATMG) database using the called party subscriber identifier; generating a messaging service message if the called party subscriber identifier exists in the CATMG database, wherein the messaging service message includes at least one of a short messaging service (SMS) message, an email message, an instant message service message, and a multimedia messaging service message; and transmitting the messaging service message to a contact address.

\* \* \* \* \*